(12) United States Patent
Kodama (10) Patent No.: US 10,853,234 B2
(45) Date of Patent: Dec. 1, 2020

(54) MEMORY CONTROLLER

(71) Applicant: Toshiba Memory Corporation, Tokyo (JP)

(72) Inventor: Sho Kodama, Kawasaki Kanagawa (JP)

(73) Assignee: TOSHIBA MEMORY CORPORATION, Tokyo (JP)

( * ) Notice: Subject to any disclaimer, the term of this patent is extended or adjusted under 35 U.S.C. 154(b) by 0 days.

(21) Appl. No.: 15/693,275

(22) Filed: Aug. 31, 2017

(65) Prior Publication Data

US 2018/0276114 A1     Sep. 27, 2018

(30) Foreign Application Priority Data

Mar. 22, 2017   (JP) .................................. 2017-056500

(51) Int. Cl.
*G06F 12/02*     (2006.01)
*G06F 3/06*      (2006.01)
*G06F 12/06*     (2006.01)

(52) U.S. Cl.
CPC .......... *G06F 12/0246* (2013.01); *G06F 3/065* (2013.01); *G06F 3/0608* (2013.01);
(Continued)

(58) Field of Classification Search
CPC ............. G06F 12/0246; G06F 12/0638; G06F 2212/205; G06F 2212/7201; G06F 3/0679
See application file for complete search history.

(56) References Cited

U.S. PATENT DOCUMENTS 6,816,942 B2 * 11/2004 Okada ................... G06F 3/0601
                                                            710/68
7,161,506 B2 *  1/2007 Fallon ....................... G06T 9/00
                                                            341/51

(Continued)

FOREIGN PATENT DOCUMENTS

JP        2005301885 A    10/2005
JP        2005311885 A    11/2005

(Continued)

OTHER PUBLICATIONS

Suh et al "Extent Mapping Scheme for Flash Memory Devices" [online] Published to IEEE Xplore Sep. 13, 2012 [retrieved on May 28, 2019]. Retrieved from the Internet <URL: https://ieeexplore.ieee.org/document/6298193> (Year: 2012).*

*Primary Examiner* — David Yi
*Assistant Examiner* — Dustin B. Fulford
(74) *Attorney, Agent, or Firm* — Kim & Stewart LLP (57) ABSTRACT

A memory controller controls first and second memory, and includes a control unit. In response to a first write command from a host, which designates a logical address for first data to be written to the first memory, the control unit determines whether mapping of the logical address is presently being managed in a first mode with a first cluster size or a second mode with a second cluster size that is smaller than the first cluster size, changes first mapping data for the logical address stored in a first table in the second memory, from the first cluster size to the second cluster size, if the mapping of the logical address is being managed in the first mode and the first mapping data can be compressed at a ratio lower than a first compression ratio, and writes the first data to a physical address of the first memory.

20 Claims, 7 Drawing Sheets

(52) U.S. Cl.
CPC .......... *G06F 3/0616* (2013.01); *G06F 3/0619* (2013.01); *G06F 3/0634* (2013.01); *G06F 3/0679* (2013.01); *G06F 12/0638* (2013.01); *G06F 2212/1036* (2013.01); *G06F 2212/1044* (2013.01); *G06F 2212/205* (2013.01); *G06F 2212/401* (2013.01); *G06F 2212/7201* (2013.01); *G06F 2212/7206* (2013.01)

(56) References Cited

U.S. PATENT DOCUMENTS

| | | | |
|---|---|---|---|
| 7,702,875 B1* | 4/2010 | Ekman | G06F 12/08 710/68 |
| 9,195,594 B2 | 11/2015 | Cohen | |
| 9,229,876 B2 | 1/2016 | Slepon | |
| 9,946,462 B1* | 4/2018 | Li | G06F 3/0608 |
| 2009/0222617 A1* | 9/2009 | Yano | G06F 12/0246 711/103 |
| 2013/0246721 A1 | 9/2013 | Fukutomi et al. | |
| 2013/0346720 A1* | 12/2013 | Colgrove | G06F 3/0608 711/165 |
| 2015/0169465 A1* | 6/2015 | Slepon | G06F 12/1009 711/103 |
| 2016/0139847 A1* | 5/2016 | Ueki | G06F 3/0638 711/103 |

FOREIGN PATENT DOCUMENTS

| | | |
|---|---|---|
| JP | 2014142931 A | 8/2014 |
| JP | 5687639 B2 | 3/2015 |

\* cited by examiner

| LBA SEGMENT NUMBER | CLUSTER MODE INFORMATION |
|---|---|
| #0 | LARGE CLUSTER |
| #1 | NORMAL CLUSTER |
| #2 | NORMAL CLUSTER |
| ⋮ | ... |
| #k-3 | LARGE CLUSTER |
| #k-2 | LARGE CLUSTER |
| #k-1 | LARGE CLUSTER |

| LCA (8 KB BASIS) | LCA0 (4 KB BASIS) | LCA1 (4 KB BASIS) |
|---|---|---|
| 0x00000052 | 0x000000A4 | 0x000000A5 |
| 0x00000053 | 0x000000A6 | 0x000000A7 |
| 0x00000054 | 0x000000A8 | 0x000000A9 |
| 0x00000055 | 0x000000AA | 0x000000AB |
| 0x00000056 | 0x000000AC | 0x000000AD |
| 0x00000057 | 0x000000AE | 0x000000AF |

FIG. 5

| PCA (8 KB BASIS) | PCA0 (4 KB BASIS) | PCA1 (4 KB BASIS) |
|---|---|---|
| 0x00000042 | 0x00000084 | 0x00000085 |
| 0x00000043 | 0x00000086 | 0x00000087 |
| 0x00000044 | 0x00000088 | 0x00000089 |
| 0x00000045 | 0x0000008A | 0x0000008B |
| 0x00000046 | 0x0000008C | 0x0000008D |
| 0x00000047 | 0x0000008E | 0x0000008F |

FIG. 6

LARGE CLUSTER MODE

FIG. 7

NORMAL CLUSTER MODE

FIG. 8

| LCA (4 KB BASIS) | LCA (8 KB BASIS) | POSITION ON CLUSTER (in 8 KB CLUSTER) |
|---|---|---|
| 0x00000038 | 0x0000001C | 0 |
| 0x00000039 | 0x0000001C | 1 |
| 0x0000003A | 0x0000001D | 0 |
| 0x0000003B | 0x0000001D | 1 |
| 0x0000003C | 0x0000001E | 0 |
| 0x0000003D | 0x0000001E | 1 |

FIG. 9

| PCA (4 KB BASIS) | PCA (8 KB BASIS) | POSITION ON CLUSTER (in 8 KB CLUSTER) |
|---|---|---|
| 0x00000088 | 0x00000044 | 0 |
| 0x00000089 | 0x00000044 | 1 |
| 0x0000008A | 0x00000045 | 0 |
| 0x0000008B | 0x00000045 | 1 |
| 0x0000008C | 0x00000046 | 0 |
| 0x0000008D | 0x00000046 | 1 |

FIG. 10

MEMORY CONTROLLER

CROSS-REFERENCE TO RELATED APPLICATION

This application is based upon and claims the benefit of priority from Japanese Patent Application No. 2017-056500, filed Mar. 22, 2017, the entire contents of which are incorporated herein by reference.

FIELD

Embodiments described herein relate generally to a memory controller that controls a nonvolatile memory.

BACKGROUND

In a memory system, such as a solid state drive (SSD), mapping between a logical address designated by a host and a corresponding physical address is managed using a logical-to-physical conversion table. One purpose of using a logical-to-physical conversion table is to speed up reading and writing processing, and thus, inmost cases, at least a part of the logical-to-physical conversion table is cached in a volatile memory, such as a dynamic random access memory (DRAM). Because the required size of the logical-to-physical conversion table is increased in proportion with the storage capacity of the SSD, thus as memory system storage capacity increases it becomes desirable find ways to reduce the required size of the logical-to-physical conversion tables.

DETAILED DESCRIPTION

An example embodiment provides a memory controller that reduces of the size of a logical-to-physical conversion table and thereby improves the efficiency of a nonvolatile memory.

In general, according to one embodiment, there is provided a memory controller that controls a nonvolatile first memory and a second memory that is accessible at a higher speed than the first memory and includes a control unit. In response to a first write command from a host, which designates a logical address for first data to be written to the first memory, the control unit determines whether mapping of the logical address is presently being managed in a first mode in which a minimum unit of data management is a first cluster size or a second mode in which the minimum unit of data management is a second cluster size that is smaller than the first cluster size, changes first mapping data for the logical address stored in a first table in the second memory, from the first cluster size to the second cluster size, if the mapping of the logical address is being managed in the first mode and the first mapping data can be compressed at a ratio lower than a first compression ratio, and writes the first data to a physical address of the first memory.

Example memory controllers according to the disclosure will be described below with reference to the accompanying drawings. It is noted that these examples do not act to limit the scope of the present disclosure.

Figure 1:
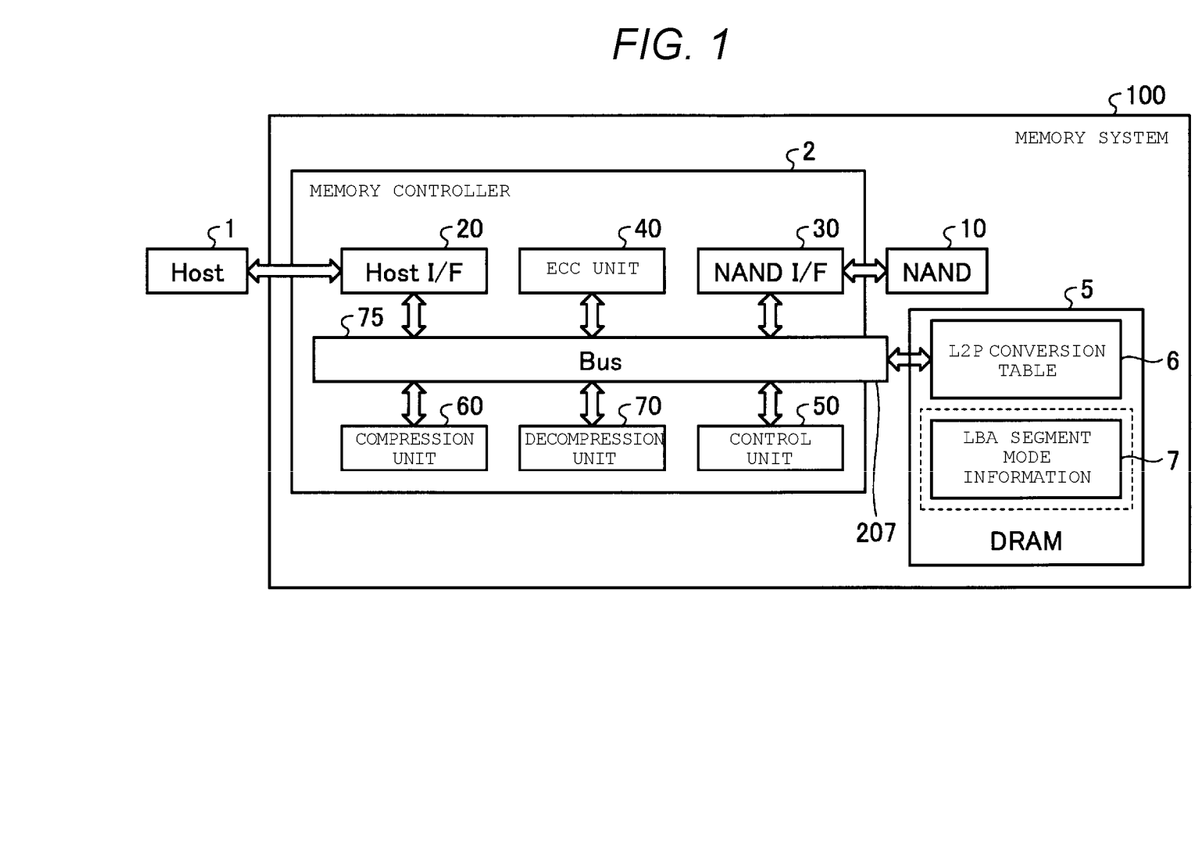
FIG. 1 is a block diagram illustrating a configuration of a memory system according to an embodiment.

FIG. 1 is a block diagram illustrating an example of a configuration of a memory system 100. The memory system 100 is can be connected to a host apparatus 1 (also referred to as host 1) and function as an external storage device of the host 1. The host 1, for example, may be an information processing apparatus, such as a personal computer, a cellular telephone, an imaging apparatus, a portable terminal, such as a tablet computer or a smartphone, a game machine, or a vehicle-mounted terminal, such as a car navigation system.

In this example, the memory system 100 is an SSD. The memory system 100 includes a memory controller 2, a NAND flash memory 10 (also referred to as NAND 10) as a nonvolatile memory, and a DRAM 5 as a volatile memory. The nonvolatile memory is not limited to NAND flash memory, and may be a three-dimensional flash memory, Resistance Random Access Memory (ReRAM), Ferroelectric Random Access Memory (FeRAM), or the like.

The NAND 10 has one or more memory chips having a memory cell array. The memory cell array includes a plurality of memory cells (also referred to as cells) arranged in a matrix. The memory cell array has a plurality of physical blocks, each of which serves as a unit of data erasing. Each physical block is has a plurality of physical sectors therein. Beyond these aspects, no limitation is particularly imposed on the configuration of the memory cell array. A two-dimensional memory cell is possible, a three-dimensionally stacked memory cell array is possible, and an array type other than these types is possible. Pieces of data in a plurality of cells in the same physical block are collectively erased. Data is read and written on a per-physical sector basis. Each physical sector of one physical block includes a plurality of cells that are connected to a word line.

In this example, each cell is available for multi-value storage. In a case where cells operate in a single level cell (SLC) mode, then one physical sector corresponds to one page. In a case where cells operate in a multi-level cell (MLC) mode, each physical sector corresponds to two pages. In a case where cells operate in a triple level cell (TLC) mode, each physical sector corresponds to three pages. In a case where cells operate in a quadruple level cell (QLC) mode, each physical sector corresponds to four pages.

User data that is transmitted from the host 1, management information for managing the user data, and the like are stored in the NAND 10. When activation is performed, that is, when read and write requests, and so forth, that are received from the host 1 are performed, a part or all of the management information that is stored in the NAND 10 is loaded into (cached into) the DRAM 5. The management information that is cached into the DRAM 5 is backed up (is also stored) in the NAND 10.

The DRAM 5 is a volatile semiconductor memory that is accessible at a higher speed than the NAND 10. Instead of the DRAM 5, a Static Random Access Memory (SRAM) may also be used. The management information includes a logical-to-physical conversion table 6, also referred to as a L2P conversion table 6, as an address conversion table, LBA segment mode information 7 (also referred to as mode management information), block management information (not specifically illustrated), and the like. Registered in the L2P conversion table 6 is mapping data indicating a correspondence relationship between a logical address used by the host 1 and a physical address of the NAND 10. As the logical address, for example, Logical Block Addressing (LBA) is used. The physical address indicates a storage position in the NAND 10 at which data is stored. Included in the LBA segment mode information 7 is cluster mode information for identifying whether each LBA segment is to be managed in a large cluster mode or in a normal cluster mode. In other words, a correspondence relationship between an LBA segment, as a unit of logical address management, and the cluster mode information is managed with the LBA segment mode information 7. The LBA segment has a size that corresponds to N large clusters. Here, N is an integer that is equal to or greater than 1. The cluster is a unit of addressing between a logical space and a physical space of the NAND 10.

The block management information, for example, includes the following information:

The number of times (erase count) that erasing has been performed on a per-block basis Information for distinguishing whether a block is an active block or a free block Block address of a bad block.

Valid data is recorded in the active blocks. The valid data is not recorded in the free blocks. The free blocks are reusable after data has been erased. The valid data is data that correlates with the logical address, and invalid data is data with which the logical address does not correlate. An erasing-completed block becomes an active block when data is written thereto. A bad block does not operate normally for whatever various reasons and thus is unusable for storing valid data.

The memory controller 2 controls writing to the NAND 10 according to the write request from the host 1. Furthermore, reading from the NAND 10 is controlled according to a read request from the host 1. The memory controller 2 includes a host interface (I/F) 20, a NAND I/F 30, an ECC unit 40, a control unit 50, a compression unit 60, and a decompression unit 70. The host interface (I/F) 20, the NAND I/F 30, the ECC unit 40, the control unit 50, the compression unit 60, the decompression unit 70, and the DRAM 5 are connected to each other through an internal bus 75.

The host I/F 20 performs processing in compliance with specifications for interface with the host 1, and outputs commands, user data, and the like to the internal bus 75. Furthermore, the host I/F 20 transmits user data that has been read from the NAND 10, a response from the control unit 50, and the like to the host 1. In the present description, data that is written to the NAND 10 according to a write request from the host 1 is referred to as user data.

The NAND I/F 30 performs processing for writing write data to the NAND 10 based on an instruction of the control unit 50. Furthermore, the NAND I/F 30 performs processing for reading from the NAND 10 based on an instruction of the control unit 50.

The memory system 100 receives the write request and the read request from the host 1. The write request includes a write command, a write address, and write data. The read request includes a read command and a read address. In a case where the write request is received, the host I/F 20 supplies the write command, the write address, and the write data to the control unit 50. The control unit 50 converts the write address, which is supplied from the host 1 as a logical address, into a physical address for the NAND 10 using the L2P conversion table 6, and then writes the write data to the physical address that results from the conversion processing. In a case where a read request is received, the host I/F 20 supplies a read command and the read address to the control unit 50. The control unit 50 converts the read address, which is supplied from the host 1 as a logical address, into a physical address for the NAND 10 using the L2P conversion table 6, and then reads data at the physical address that results from the conversion processing. The control unit 50 transmits the data that has been read to the host 1 through the host I/F 20.

The error correction code (ECC) unit 40 performs coding processing for error correction on the write data, and generates a parity bit or the like. The ECC unit 40 encodes the write data and the parity bit (or the like) and supplies this encoded data to the NAND I/F 30. As a coding scheme performed by the ECC unit 40, any scheme may be used. For example, coding schemes, such as Reed Solomon (RS), Bose Chaudhuri Hocquenghem (BCH), and Low Density Parity Check (LDPC) can be used. The ECC unit 40 also performs decoding processing on the data (e.g., read data) that is input from the NAND I/F 30, and supplies the decoded data into the host I/F 20.

The control unit 50 controls the various elements of the memory system 100. The control unit 50 can be realized as a functional unit by one or more CPUs (processors) executing firmware which has been loaded onto DRAM 5 and a peripheral circuit. In a case where a command is received from the host 1 through the host I/F 20, the control unit 50 performs control according to the command. For example, in a case where the write command is received from the host I/F 20, the control unit 50 instructs the ECC unit 40 to encode the write data. Furthermore, the control unit 50 instructs the NAND I/F 30 to write an encoded data (e.g., user data and parity) generated by the ECC unit 40 into the NAND 10. According to the writing, management information including the L2P conversion table 6, which is managed in the DRAM 5, is updated. Furthermore, in a case where the read command is received from the host I/F 20, the control unit 50 instructs the NAND I/F 30 to read encoded data (e.g., user data and parity) from the NAND 10 based on the L2P conversion table 6. Furthermore, the control unit 50 instructs the ECC unit 40 to decode the encoded data that has been read. Furthermore, the control unit 50 instructs the host I/F 20 to transmit the decoded user data to the host 1.

The compression unit 60 performs lossless compression of mapping data in the L2P conversion table 6 according to the instruction of the control unit 50. The compression unit 60 compresses the mapping data on a per-LBA segment basis. The compression-target LBA segment is an LBA segment to which the normal cluster mode applies. As a technique for compression, any technique in which lossless compression is possible can be employed. Because lossless compression is used in the compression unit 60, data compression cannot be completely compensated for.

The decompression unit 70 performs a data conversion processing that is the reverse of the compression processing in the compression unit 60, and thus decompresses the compressed L2P conversion table and restores the original L2P conversion table.

A capacity (storage size) of the L2P conversion table 6 being cached increases in proportion to the storage capacity of the memory system. One of the techniques of reducing the L2P conversion table size is use of a large cluster. A cluster is an addressing unit between a logical space and a physical space of the NAND 10. That is, in the L2P conversion table 6, addressing is mapped on a per-cluster basis. The cluster is a unit of management that results from dividing a page of the NAND 10 into M parts, for example. Here, M is an integer that is equal to or greater than 1. The addressable unit size is increased by using a larger cluster, and thus the total number of address mapping entries in the L2P conversion table 6 can be reduced and an amount of memory required to cache the L2P conversion table 6 can be reduced thereby.

For example, when the use of a larger cluster increases the unit of addressing to twice as large as a normal cluster, the total number of address mapping entries in the L2P conversion table 6 is reduced by half and thus the amount of required memory storage is reduced by half. However, when a larger cluster is used, the addressable unit is correspondingly increased, and the efficiency of page usage in the NAND 10 may be decreased, and a Write Amplification Factor (WAF) may be increased. This may cause a decrease in the lifetime and performance of the SSD 100.

In the present embodiment here, each entry in the L2P conversion table 6 can be managed for two cluster modes (large cluster mode and normal cluster mode). The large cluster mode and the normal cluster mode are also referred to a LC mode and a NC mode, respectively. Furthermore, in the present embodiment, the mapping data for the NC mode is compressed and this compressed mapping data is stored in the L2P conversion table 6. A logical address space of the NAND 10 is managed by a cluster mode on a per-LBA sector basis. That is, the cluster mode information for identifying whether each LBA sector is managed in the LC mode or in the NC mode is stored in the LBA segment mode information 7. In this manner, the use of a larger cluster can provide a reduction in a size of the L2P conversion table, and the use of a normal cluster with compression maintains the efficiency of page usage of the NAND 10.

Figure 2:
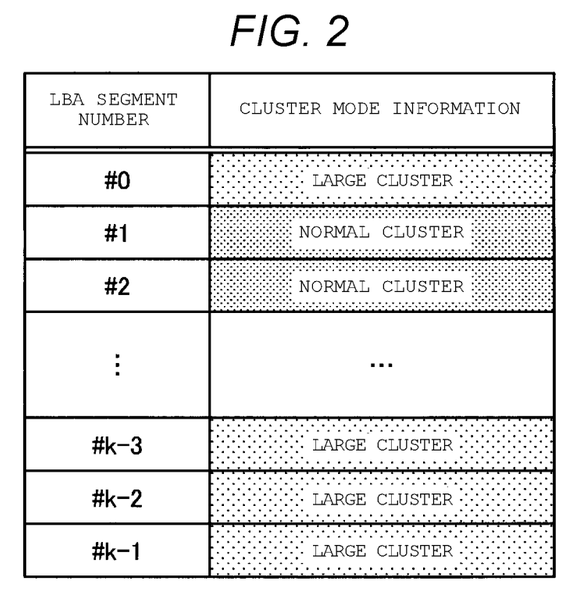
FIG. 2 is a conceptual diagram illustrating an example of mode management information.

FIG. 2 is a conceptual diagram illustrating LBA segment mode information 7. In the case of FIG. 2, the logical address space (LBA space) is divided into a total of K LBA segments, each having a predetermined size. Each LBA segment has a size that corresponds to N large clusters. Alternatively, it can also be said that the size of the LBA segments corresponds to the number of entries provided in the L2P conversion table 6. The LBA segment mode information includes cluster mode information for identifying whether each particular LBA segment is being managed in the LC mode or the NC mode. In FIG. 2, the cluster mode for LBA segment number #0 is the LC mode. The cluster mode of LBA segment number #2 is the NC mode. In a default state of the memory system 100, all LBA segments #0 to # K−1 can be set to be managed in the LC mode. In the following description, it is assumed that each page of the NAND 10 is 16 KB in size, a cluster size in the LC mode is 8 KB, and a cluster size in the NC mode is 4 KB. It is assumed that the unit of addressing for the LBA is 512 Bytes. It is noted that sizes other than these particular sizes may be possible and that, in other examples, the size of the large cluster may be three or more times as large as the size of the normal cluster.

Figure 3:
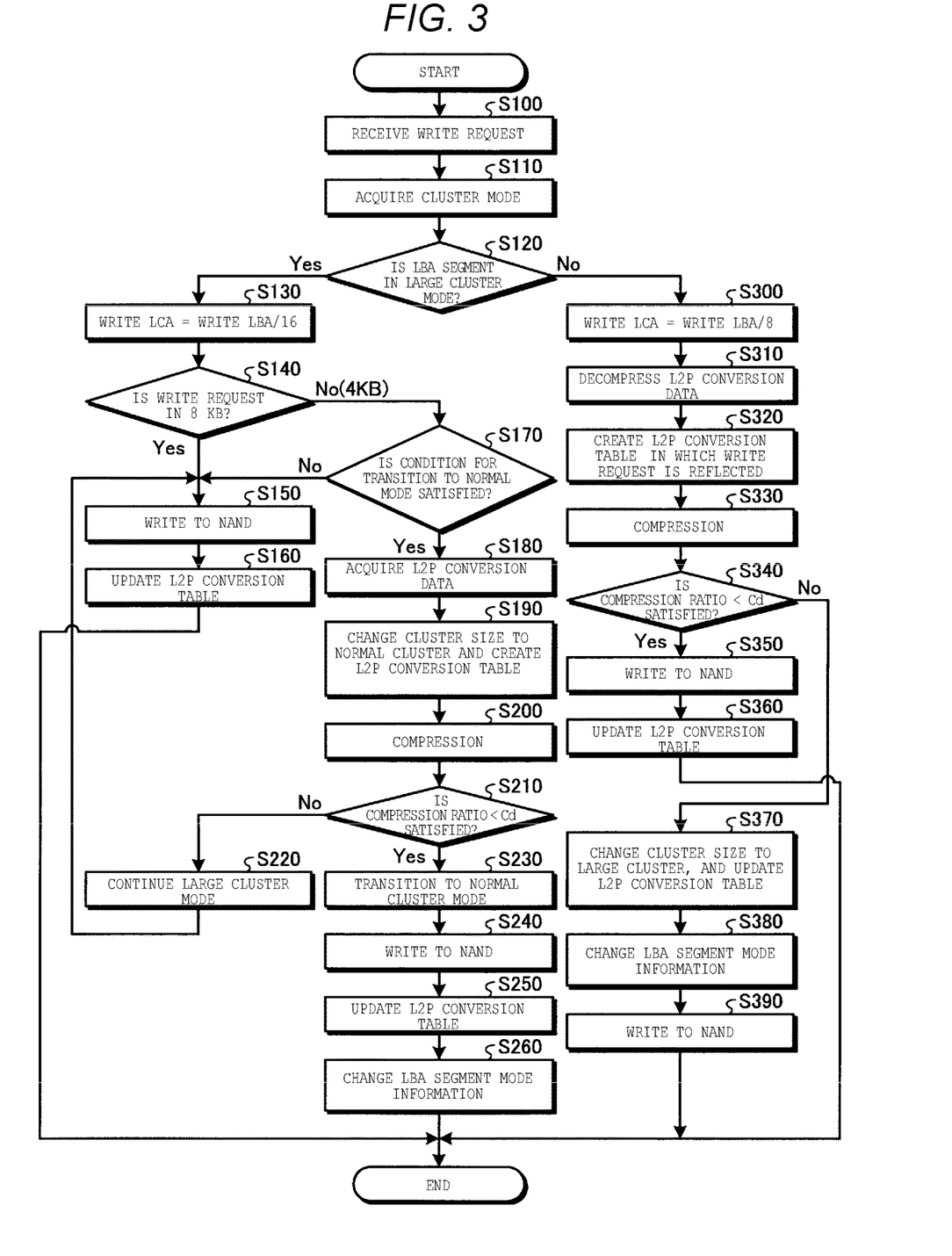
FIG. 3 is a flowchart illustrating a procedure for operation of the memory system that is executed when a write request is received.

FIG. 3 is a flowchart illustrating a procedure for operation of the memory system 100 that is executed when a write request is received. An example of the operation of the memory system 100 will be described below with reference to FIG. 3. When the write request that includes the write command, the write LBA, and the write data is received from the host 1 (S100), the host I/F 20 inputs the write request into the control unit 50. The control unit 50 normalizes the acquired write request on per-large cluster size basis (8 KB) and/or on a per-normal cluster size basis (4 KB) as follows.

(a) In a case where a data size of the write request exceeds an integer multiple of the large cluster size, the received write request can be divided into write requests having a large cluster size and write requests having a normal cluster size.

(b) In a case the data size of the write request is less than one normal cluster size, the write data is regarded as data with the normal cluster size and is processed accordingly. That is, the write data is stored in a position that corresponds to write LBA on the physical cluster having the normal cluster size.

(c) In a case where the data size of the write request is greater than the normal cluster size and is less than the large cluster size, the write data is treated as two pieces of data each having the normal cluster size and is processed accordingly.

When the size normalization is ended, the control unit 50 acquires the cluster mode information of the LBA segment to which the write LBA belongs from the LBA segment mode information 7 (S110), and determines that the LBA segment is in one of the LC mode and the NC mode (S120).

Case Where the LBA Segment is in the LC Mode

In a case where the LBA segment is in the LC mode (Yes in S120), the control unit 50 converts the write LBA into an LCA logical cluster address LCA, which, according to Equation (1) below, is on an 8 KB basis (S130). Here, the symbol ">>" is a bit operator for rightward shift. Equation (1) illustrates that the LBA is shifted by four bits to the right (note, here the LBA is divided by 16).

$$LCA = LBA >> 4 \qquad \text{Equation (1)}$$

In the L2P conversion table 6, a correspondence between a logical cluster address LCA and a physical cluster address PCA of the NAND 10 is mapped. The LBA is converted into the LCA and is further converted into the PCA. Next, the control unit 50 determines the size of the write request is 8 KB and 4 KB (S140).

In a case where the size of the write request is 8 KB (Yes in S140), the control unit 50 determines the physical cluster address PCA that is a writing destination of the write data, and instructs the ECC unit 40 to code the write data. Furthermore, the control unit 50 instructs the NAND I/F 30 to write the codeword (e.g., the data and the parity) that is generated by the ECC unit 40, to the determined physical cluster address PCA. Accordingly, in this example, after the parity is added to the write data, the write data is written to the physical cluster address PCA that is a certain page within an erasing-completed free block in the NAND 10 (S150). The control unit 50 updates the L2P conversion table 6 with the logical cluster address LCA that results from the conversion in Equation (1) and the physical cluster address PCA that is the actual writing destination (S160).

In a case where the size of the write request is 4 KB (No in S140), the control unit 50 determines whether a write request-target LBA segment satisfies a condition for transition from the LC mode to the NC mode (S170). As the condition for the transition, for example, a ratio of valid data to all data in LBA segment is employed. The valid-data ratio is the ratio of the valid data to all the data in the LBA segment. When the valid-data ratio is smaller than a predetermined threshold, it is determined that the transition condition is satisfied.

In a case where the condition for the transition is not satisfied (No in S170), the control unit 50 continues to use the LC mode for the LBA segment. That is, the control unit 50 determines the physical cluster address PCA that is the writing destination of the write data and instructs the ECC unit 40 to code the write data. Furthermore, the control unit 50 instructs the NAND I/F 30 to supply the codeword that was generated by the ECC unit 40, to the determined physical cluster address PCA. Accordingly, after the parity (or the like) is added to the write data, the write data is written to the physical cluster address PCA that is a certain page within an erasing-completed free block in the NAND 10 (S150). The control unit 50 updates the L2P conversion table 6 with the logical cluster address LCA that results from the conversion in Equation (1) and the physical cluster address PCA that is the writing destination (S160).

It is noted that it is assumed that a position to which 4 KB data can be written in a case where the cluster size is 8 KB is determined according to the following Equation (2). In a case where the writing position=0, it is assumed that the writing position is the first half area of the 8 KB cluster. In a case where writing position=1, it is assumed that the writing position is the last half area of the 8 KB cluster. Here, the symbol "&" is an AND operator. Equation (2) illustrates that the LBA is shifted by three bits to the right, and one bit at a lower position is taken.

$$\text{Writing position}=(LBA>>3)\ \&\ 1 \qquad \text{Equation (2)}.$$

Figure 4:
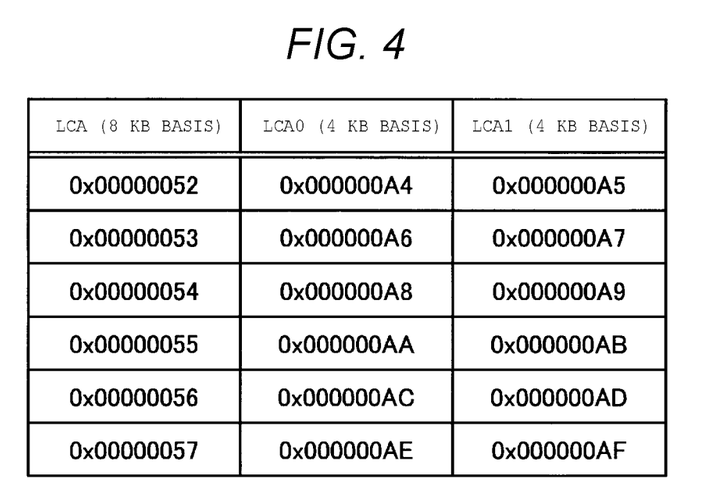
FIG. 4 is a diagram illustrating an example of a logical cluster address (LCA) that is present when conversion from a large cluster mode to a normal cluster mode occurs.
Figure 5:
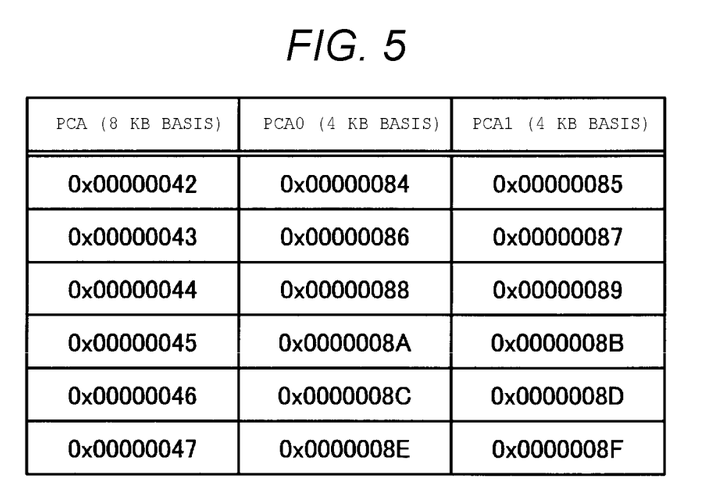
FIG. 5 is a diagram illustrating an example of a physical cluster address (PCA) that is present when the conversion from the large cluster mode to the normal cluster mode occurs.

In a case where the condition for the transition is satisfied (Yes in S170), the control unit 50 acquires L2P conversion data (also referred to as mapping data) for the LBA segment from the L2P conversion table 6 (S180). The control unit 50 determines the physical cluster address PCA that is the writing destination of the write data, and changes the acquired L2P conversion data with the logical cluster address LCA that results from the conversion in Equation (1) and the determined physical cluster address PCA, and thus reflects a current write request in the L2P conversion data. The control unit 50 performs cluster size conversion processing on the L2P conversion data in which the write request is reflected. It is noted that the cluster size conversion processing may be performed on the L2P conversion data that is present before the current write request is reflected. The cluster size conversion processing, for example, as illustrated in FIG. 4, includes converting the logical cluster address LCA, which is on an 8 KB bit basis, into two LCAs, that is, LCA0 and LCA1, on a 4 KB basis. In FIG. 4, "0x" indicates an expression in hexadecimal notation. With regard to the LCA conversion, the LCS, which is on the 8 KB basis, is multiplied by 2, and 0 and 1 are added, and thus two LCAs on the 4 KB basis are obtained. As illustrated in FIG. 5, conversion from the 8 KB basis to the 4 KB basis is also performed on the physical cluster addresses PCA. The conversion method is the same as the LCA conversion method. In this manner, the LCA and the PCA are converted from a 8 KB basis to a 4 KB basis, and thus the L2P conversion data, which is on the 4 KB basis, is created for the LBA segment (S190).

Next, the control unit 50 instructs the compression unit 60 to compress the just obtained L2P conversion data, which is on the 4 KB basis. The compression unit 60 performs compression processing (S200) and then, notifies the control unit 50 of a compression ratio. Here, a compression ratio is the ratio of compressed data size divided by the uncompressed (before compression) data size. The control unit 50 compares the compression ratio to a threshold Cd. The threshold Cd is 50%, for example. Of course, any other arbitrary value may be employed as the threshold Cd. In a case where the compression ratio is at or above threshold Cd (No in S210), the control unit 50 determines that the LC mode is maintained for the LBA segment (S220). Thereafter, the control unit 50 performs Steps S150 and S160, writes the write data, to which the parity has been added, to the NAND 10, and updates the L2P conversion table 6.

In a case where the compression ratio is below the threshold Cd (Yes in S210), the control unit 50 determines to change the cluster mode from the LC mode to the NC mode for the LBA segment (S230). The control unit 50 instructs the ECC unit 40 to encode the write data. Furthermore, the control unit 50 instructs the NAND I/F 30 to supply the codeword that has been generated by the ECC unit 40 to the determined physical cluster address PCA. Accordingly, after the parity (or the like) is added to the write data, the write data is written to the physical cluster address PCA that is a certain page within the erasing-completed free block on the NAND 10 (S240). The control unit 50 updates the L2P conversion table 6 with the L2P conversion data on which the compression and the mode changing are performed (S250). Additionally, the control unit 50 updates the LBA segment mode information 7 and changes the cluster mode information of the LBA segment from the LC mode to the NC mode (S260).

It is noted that at the time of the transition from the LC Mode to the NC mode, an attempt may be made to improve the efficiency of usage by collecting pieces of data stored in the large cluster with a poor usage ratio at the time of the LC mode and arranging the collected pieces of data in the normal cluster within successive addresses. Also, under this circumstance, the change is made only in a case where the compression ratio achieved from compressing the changed L2P conversion data is below the threshold Cd.

Figure 6:
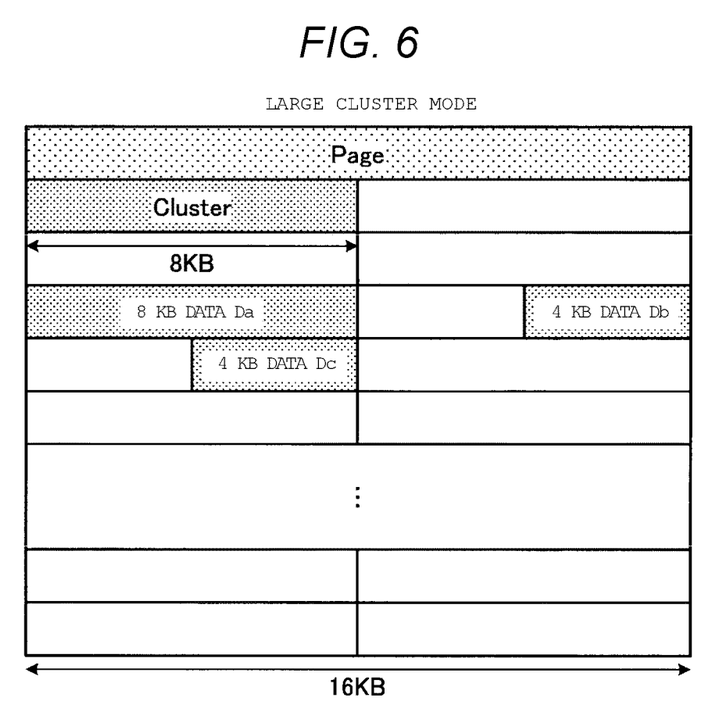
FIG. 6 is a diagram illustrating example pieces of data that are arranged within an LBA segment when in the large cluster mode.

FIG. 6 illustrates an example of an arrangement on the NAND 10, of pieces of data that correspond to a certain LBA segment which is managed in the LC mode. One page (=16 KB) includes two large clusters that are 8 KB in size. Because 8 KB data Da is consistent with the LC size, a cluster usage ratio is 100%, but because sizes of pieces of 4 KB data Db and Dc are smaller than LC size, there is a possibility that the cluster usage ratio will be decreased by 50%. In an example in FIG. 6, it is assumed that positions of pieces of data Db and Dc in the cluster, which are obtained by Equation (2), are identical with each other. In this case, the pieces of data Db and Dc are not stored in the same cluster, and the efficiency of page usage of the NAND 10 is decreased.

Case Where LBA Segment is in the NC Mode

In a case where the LBA segment is in the NC mode (No in S120), the control unit 50 converts the write LBA into an LCA logical cluster address LCA, which is on the 4 KB basis, according to Equation (3) (S300). Equation (3) illustrates that the LBA is shifted by three bits to the right.

$$LCA=LBA>>3 \qquad \text{Equation (3)}$$

The LBA segment to which the write LBA belongs is 4 KB on a per-LCA basis, and the L2P conversion data that corresponds to the LBA segment is compressed in the L2P conversion table 6. The control unit 50 causes the decompression unit 70 to decompress the L2P conversion data that is read, which corresponds to the LBA segment (S310).

Figure 7:
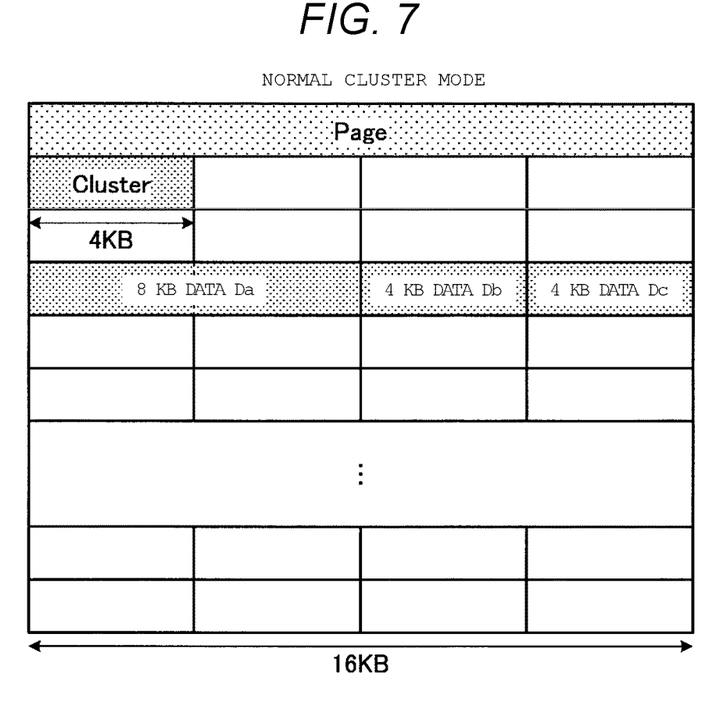
FIG. 7 is a diagram illustrating example pieces of data that are arranged within an LBA segment when in the normal cluster mode.

FIG. 7 illustrates an example of an arrangement on the NAND 10, of pieces of data that correspond to a certain LBA segment which is managed in the NC mode. One page (=16 KB) includes four normal clusters that are 4 KB in size. In the NC mode, also in the case of 4 KB data, cluster usage ratio is 100% and the efficiency of page usage of the NAND is improved. In the case of FIG. 7, the 8 KB data Da are arranged in two clusters, and the pieces of 4 KB data Db and Dc each are arranged in one cluster apiece. In the case of the NC mode, because the LCA has no relationship with a writing data size is on the 4 KB basis, the number of entries in the L2P conversion table 6 is twice that compared with the LC mode. For this reason, the operation in the NC mode is allowed only when the size that results from compressing the L2P conversion data which corresponds to the LBA segment using the compression unit 60 falls below the threshold Cd. Consequently, the L2P conversion data in the NC mode can be set to be in an amount of data that is equal to or smaller than that in the LC mode, and the unit of addressing for the LCA can be decreased by half.

When the L2P conversion data is decompressed (S310), the control unit 50 changes the decompression-completed L2P conversion data with the logical cluster address LCA that results from the conversion in Equation (3) and the physical cluster address PCA that is determined to be the writing destination of the write data, and thus reflects the current write request in the L2P conversion data (S320).

Next, the control unit 50 instructs the compression unit 60 to compress the L2P conversion data. The compression unit 60 performs the compression processing (S330), and then notifies the control unit 50 of the compression ratio. The control unit 50 compares the compression ratio with the threshold Cd. In a case where the compression ratio is below the threshold Cd (Yes in S340), the control unit 50 determines that the NC mode continues for the LBA segment. Thereafter, the control unit 50 instructs the ECC unit 40 to encode the write data. Furthermore, the control unit 50 instructs the NAND I/F 30 to supply the codeword generated by the ECC unit 40 to the determined physical cluster address PCA. Accordingly, after the parity is added to the write data, the write data is written to the physical cluster address PCA that is a certain page within the erasing-completed free block on the NAND 10 (S350). The control unit 50 updates the L2P conversion table 6 with the compressed L2P conversion data (S360).

In a case where the compression ratio is at or above threshold Cd (No in S340) for the LBA segment, the control unit 50 determines to change the cluster mode from the NC mode to the LC mode. The control unit 50 changes the decompression-completed L2P conversion data, in which the current write request is reflected, so that the changed L2P conversion data is compatible with the LC mode, and then updates the L2P conversion table 6 with the changed L2P conversion data (S370). Additionally, the control unit 50 updates the LBA segment mode information 7 and changes the cluster mode information of the LBA segment to indicate the LC mode (S380). Furthermore, the control unit 50 controls the ECC unit 40 and the NAND I/F 30, and writes the write data, to which the parity is added, to the physical cluster address PCA that is a certain page within the erasing-completed free block on the NAND 10 (S390). It is noted that after the writing to the NAND 10 is performed, the update of the L2P conversion table 6 and the LBA segment mode information 7 may be performed.

Figure 8:
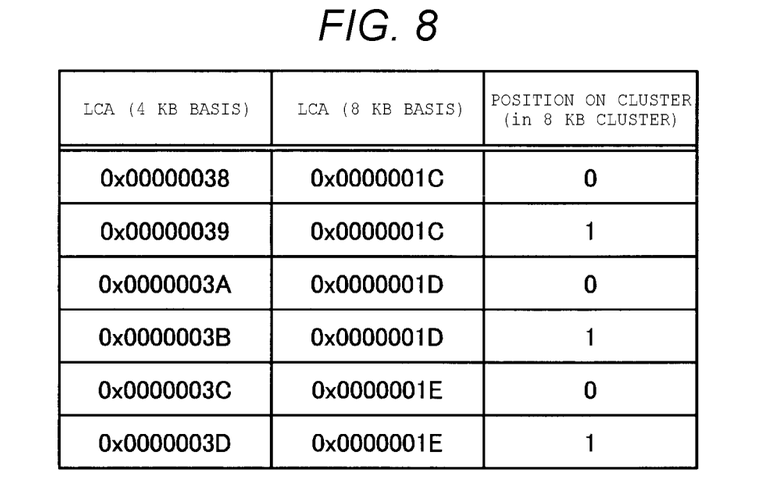
FIG. 8 is a diagram illustrating an example of a logical cluster address (LCA) that is present when conversion from the normal cluster mode to the large cluster mode occurs.
Figure 9:
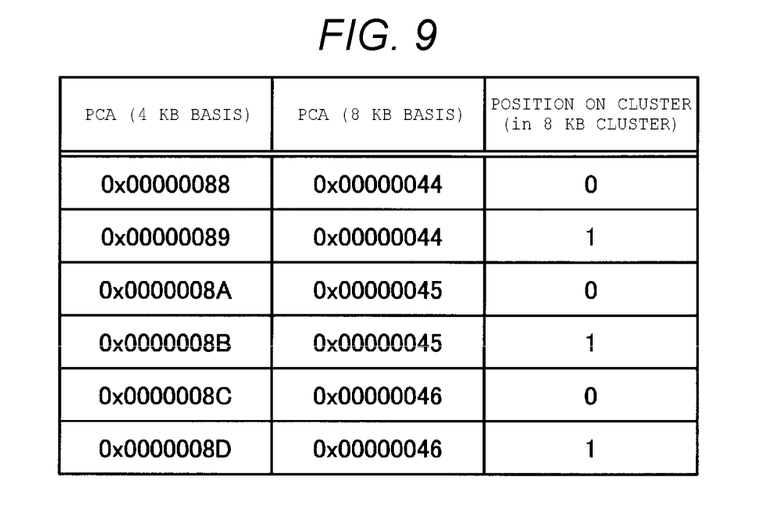
FIG. 9 is a diagram illustrating an example of a physical cluster address (PCA) that is present when conversion from the normal cluster mode to the large cluster mode occurs.

The change from the NC mode to the LC mode, which is performed in S370, is performed as follows. The logical cluster address LCA on the 4 KB basis, as illustrated in FIG. 8, is converted into the LCA on the 8 KB basis, and a position on the cluster is recorded. In a case where the position on the cluster=0, it is assumed that the position on the first half area of the 8 KB cluster. In a case where the position on the cluster=1, it is assumed that the position on the last half area of the 8 KB cluster. The LCA conversion is performed by dividing the LCA, which is on the 4 KB basis, by 2. For the position on the cluster, the least significant bit in the LCA on the 4 KB basis is used. As illustrated in FIG. 9, conversion from the 4 KB basis to the 8 KB basis is also performed on the physical cluster address PCA. The conversion method is the same as the LCA conversion method.

Next, a pair of LCAs on the 4 KB basis, in which PCAs that result from the conversion on the 8 KB basis are identical with each other and positions on the 8 KB cluster are identical with each other, is searched for. In a case where a change from the addressing on the 4 KB basis to the addressing on the 8 KB basis is performed, any pair of LCAs that meets this condition cannot be stored in the same cluster. For this reason, the writing destination of at least one in the pair must be changed. This change is performed by actually moving data in the NAND 10 through the NAND I/F 30.

Figure 10:
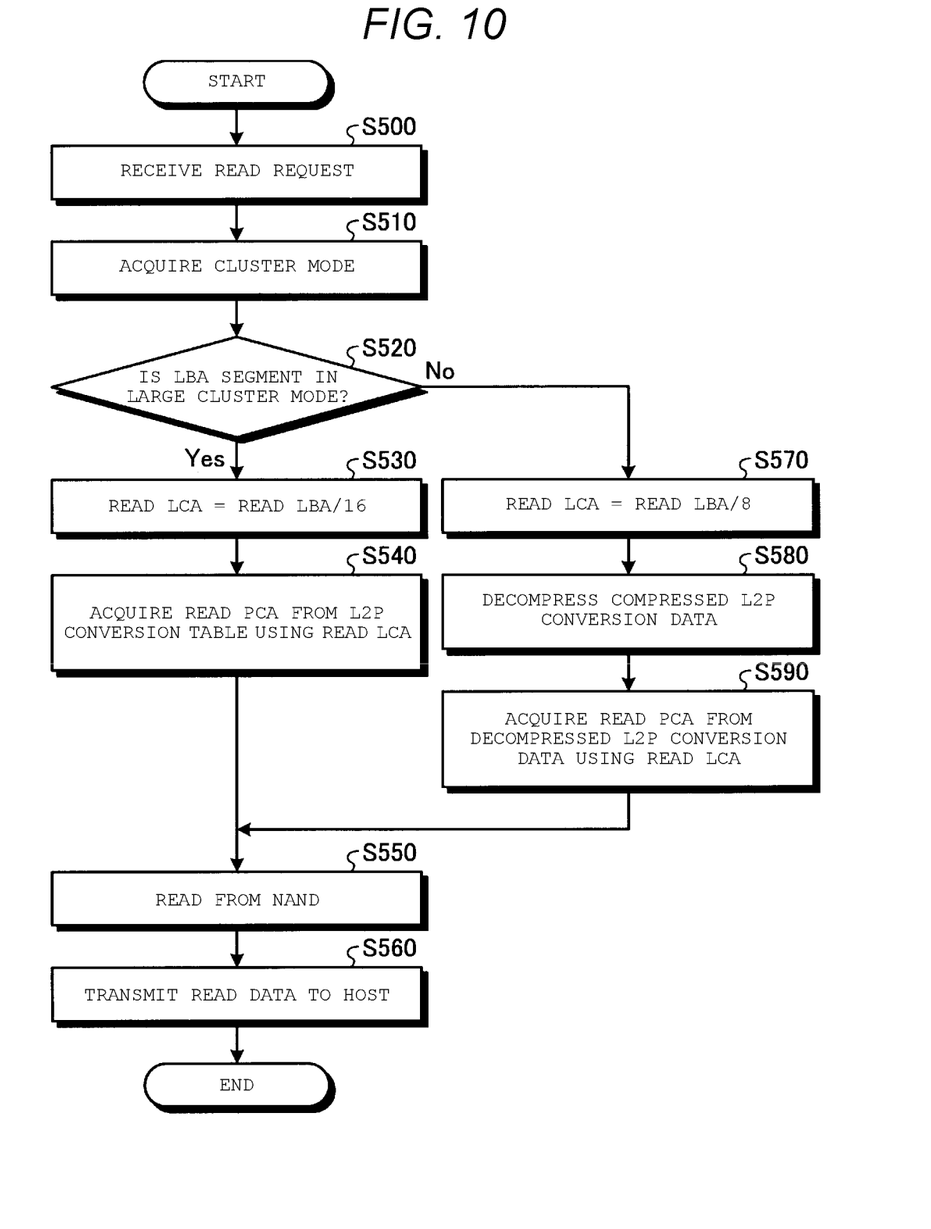
FIG. 10 is a flowchart illustrating a procedure for operation of the memory system that is executed when a read request is received.

FIG. 10 is a flowchart illustrating a procedure for operation of the memory system 100 that is executed when the read request is received. An example of the operation of the memory system 100 will be described below with reference to FIG. 10. When receiving the read request that includes the read command and read LBA, from the host 1 (S500), the host I/F 20 inputs the read request into the control unit 50.

When receiving the read request, the control unit 50 performs the following processing:

(a) In a case where a read request has a size that is less than the normal cluster size (4 KB), such a read request is regarded as a 4 KB read request and reading processing is performed in the same manner as in a case where the 4 KB read request is performed. The read data is obtained, and then the read data that corresponds to read LBA which was designated in the read request is extracted, and only the extracted read data is transmitted in response to the host 1.

(b) In a case where the read request has a size that is greater than the normal cluster size and is less than the large cluster size (8 KB), a 4 KB read request can be regarded as being performed two times, and the processing is performed accordingly. After two pieces of 4 KB read data are obtained, the read data corresponding to the read LBA designated by a read request is extracted and only this extracted read data is transmitted in response to the host 1.

(c) In a case where the read request has a size that exceeds the large cluster size is received, the received read request is divided into one or more read requests of the large cluster size and one or more read request of the normal cluster size.

Based on the LBA segment mode information 7, the control unit 50 acquires the cluster mode of the LBA segment to which the read LBA belongs (S510), and determines in which one of the LC mode and the NC mode the LBA segment to which the read LBA belongs is (S520).

Case Where the LBA Segment is in the LC Mode

In the case where the LBA segment is in the LC mode (Yes in S520), the control unit 50 converts the write LBA into the logical cluster address LCA, which is on the 8 KB basis, according to Equation (1) (S530). The control unit 50 acquires the physical cluster address PCA that is a reading destination, from the L2P conversion table 6, using the obtained LCA (S540). The control unit 50 instructs the NAND I/F 30 to read data from the physical cluster address PCA. The NAND I/F 30 reads data from the NAND 10 (S550), and inputs the data that is read into the ECC unit 40. The ECC unit 40 performs the decoding processing for error correction. The control unit 50 suitably performs the data extraction processing described above on the decoded data, and then transmits the data that has been read to the host 1 through the host I/F 20 (S560).

Case Where the LBA Segment is in the NC Mode

In the case where the LBA segment is in the NC mode (No in S520), the control unit 50 converts the write LBA into the logical cluster address LCA, which is on the 4 KB basis, according to Equation (3) (S570). The control unit 50 reads the compressed L2P conversion data, which corresponds to the LBA segment to which the logical cluster address LCA corresponds, from the L2P conversion table 6, and causes the decompression unit 70 to decompress the L2P conversion data that is read (S580). The control unit 50 acquires the physical cluster address PCA that is the reading destination, using the LCA that is obtained in Equation (3) and the decompressed L2P conversion data (S590). The control unit 50 instructs the NAND I/F 30 to read data from the physical cluster address PCA. The NAND I/F 30 reads data from the NAND 10 (S550), and inputs the data that is read, into the ECC unit 40. The ECC unit 40 performs the decoding processing for error correction on the data that is read. The control unit 50 suitably performs the data extraction processing described above on the decoded data, and then transmits the data that has been read to the host 1 through the host I/F 20 (S560).

As described above, the use of the larger cluster can realize a reduction in the amount of L2P conversion data that must be stored, and the use of a normal cluster and compression make it possible to improve the efficiency of page usage of the NAND 10, lengthen the lifetime of the memory system, and realize the improvement in performance.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory controller that controls a nonvolatile, first memory and a second memory that is accessible at a higher speed than the first memory, the memory controller comprising:
    a processor that is configured to, in response to a first write command from a host, which designates a logical address for first data to be written to the first memory:
        determine whether mapping of the logical address is presently being managed in a first mode in which a minimum unit of data management between a logical space and a physical space of the first memory is a first cluster size or a second mode in which the minimum unit of data management is a second cluster size that is smaller than the first cluster size;
        decompress first mapping data for the logical address stored in a first table in the second memory if the mapping of the logical address is being managed in the second mode;
        update the first mapping data with the physical address to which the first data is to be written;
        when the mapping of the logical address is being managed in the first mode, a data size of the first data is equal to the second cluster size, a first condition relating to a valid data ratio of the first mapping data is satisfied, and the first data can be compressed to a ratio lower than a first compression ratio, change the management of the first mapping data from the first mode to second mode, collect pieces of data stored in a first physical space being managed by the first mapping data, and then store the collected pieces of data in a second physical space managed by the first mapping data, the second physical space having consecutive physical addresses, wherein the mapping of the first physical space is being managed in the first mode, and the mapping of the second physical space is being managed in the second mode; and
        write the first data to a physical address of the first memory.

2. The memory controller according to claim 1, wherein the processor is further configured to change management of the first mapping data from the second mode to the first mode if the updated first mapping data cannot be compressed to a compression ratio lower than the first compression ratio.

3. The memory controller according to claim 2, wherein the processor is further configured to, in response to the first write command, and after the decompression, the update, and the change in management of the first mapping data:
    change the first mapping data from the second cluster size to the first cluster size and store the updated first mapping data in the first table.

4. The memory controller according to claim 3, wherein the second memory stores mode management information indicating a correspondence between different logical address ranges and mode information indicating the first mode or the second mode, and
    the processor is configured to determine in which one of the first mode or the second mode the first mapping data for a particular logical address is being managed based on the mode management information.

5. The memory controller according to claim 1, wherein the first condition relating to the valid data ratio of the first mapping data is satisfied when the valid data ratio is smaller than a predetermined threshold value.

6. The memory controller according to claim 5, wherein processor is configured to continue managing the first mapping data in the first mode if the first condition is not satisfied or the first mapping data cannot be compressed at the ratio lower than the first compression ratio when the first mapping data is being managed in the first mode and the data size of the first data is equal to the second cluster size.

7. The memory controller according to claim 1, wherein a page of the first memory is a unit of data writing, and the page is twice as large as the first cluster size.

8. The memory controller according to claim 1, wherein a page of the first memory is a unit of data writing, and the page is a natural number greater than two times as large as the first cluster size.

9. The memory controller according to claim 1, wherein the processor is configured to determine whether mapping of the logical address is presently being managed in the first mode or the second mode by acquiring mode information from a logical block address segment mode information table.

10. A method of controlling a nonvolatile first memory and a second memory that is accessible at a higher speed than the first memory, the method comprising:

in response to a first write command from a host, which designates a logical address for first data to be written to the first memory:

determining whether mapping of the logical address is presently being managed in a first mapping mode in which a minimum unit of data management between a logical space and a physical space of the first memory is a first cluster size or a second mapping mode in which the minimum unit of data management is a second cluster size that is smaller than the first cluster size;

decompressing first mapping data for the logical address stored in a first table in the second memory if the mapping of the logical address is being managed in the second mapping mode;

updating the first mapping data with the physical address to which the first data is to be written when the mapping of the logical address is being managed in the first mode, a data size of the first data is equal to the second cluster size, a first condition relating to a valid data ratio is satisfied, and the first data can be compressed to a ratio lower than a first compression ratio, changing the management of the first mapping data from the first mode to second mode, collecting pieces of data stored in a first physical space being managed by the first mapping data, and then storing the collected pieces of data in a second physical space managed by the first mapping data, the second physical space having consecutive physical addresses, wherein the mapping of the first physical space is being managed in the first mode, and the mapping of the second physical space is being managed in the second mode; and writing the first data to a physical address of the first memory.

11. The method according to claim 10, further comprising:

changing management of the first mapping data from the second mapping mode to the first mapping mode if the updated first mapping data cannot be compressed to a compression ratio lower than the first compression ratio.

12. The method according to claim 11, further comprising:

in response to the first write command, and after the decompression, the update, and the change in management of the first mapping data, changing the first mapping data from the second cluster size to the first cluster size and storing the changed first mapping data in the first table.

13. The method according to claim 12, wherein the second memory stores mode management information indicating a correspondence between different logical address ranges and mode information indicating the first mapping mode or the second mapping mode, and the mode in which the first mapping data for a particular logical address is managed is determined based on the mode management information.

14. The method according to claim 10, wherein the first condition relating to the valid data ratio of the first mapping data is satisfied when the valid data ratio is smaller than a predetermined threshold value.

15. The method according to claim 14, further comprising:

when the first mapping data is managed in the first mapping mode and the data size of the first data is equal to the second cluster size:

if the first condition is not satisfied or the first mapping data cannot be compressed at the ratio lower than the first compression ratio, continuing to manage the first mapping data in the first mapping mode.

16. The method according to claim 10, wherein a page of the first memory is a unit of data writing, and the page is twice as large as the first cluster size.

17. The method according to claim 10, wherein a page of the first memory is a unit of data writing, and the page is a natural number greater than two times as large as the first cluster size.

18. A memory controller, comprising:

a processor that is configured to:

receive a write request designating a logical block address of a first memory and including write data;

normalize the write request on a per-large cluster basis or a per-normal cluster size basis;

acquire cluster mode information of the designated logical block address from a logical block address segment mode information table;

determine whether mapping of the designated logical address is presently being managed on a large cluster size basis or a normal cluster size basis according to the acquired cluster mode information;

decompress first mapping data if the mapping of the designated logical address is being managed in the normal cluster size basis, and update the first mapping data with the physical address to which the first data is to be written;

determine whether to change management of the first mapping data from the large cluster size to the normal cluster size based on a compression ratio of the updated first mapping data; and write the first data to a physical address of the first memory.

19. The memory controller according to claim 18, wherein the processor is further configured to:

change management of the first mapping data from the normal cluster size basis to the large cluster size basis if the updated first mapping data cannot be compressed to a compression ratio lower than the first compression ratio.

20. The memory controller according to claim 18, wherein the large cluster size basis is 8 KB, and the normal cluster size basis is 4 KB, and a page size of the first memory is 16 KB.

* * * * *